United States Patent
Nakamura et al.

(10) Patent No.: US 10,294,390 B2
(45) Date of Patent: May 21, 2019

(54) COATING AGENT, AND COATING LAYER AND FILM USING SAME

(71) Applicant: AGC Inc., Chiyoda-ku (JP)

(72) Inventors: Makito Nakamura, Tokyo (JP); Kaoru Oguro, Tokyo (JP); Tomeyoshi Ohori, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 168 days.

(21) Appl. No.: 14/531,698

(22) Filed: Nov. 3, 2014

(65) Prior Publication Data

US 2015/0057409 A1 Feb. 26, 2015

Related U.S. Application Data

(63) Continuation of application No. PCT/JP2013/067132, filed on Jun. 21, 2013.

(30) Foreign Application Priority Data

Jun. 26, 2012 (JP) .................................. 2012-143222

(51) Int. Cl.
| | | |
|---|---|---|
| *C08G 18/48* | (2006.01) | |
| *C08G 18/76* | (2006.01) | |
| *C09D 175/04* | (2006.01) | |
| *C09D 175/08* | (2006.01) | |

(52) U.S. Cl.
CPC ....... *C09D 175/08* (2013.01); *C08G 18/4812* (2013.01); *C08G 18/4837* (2013.01); *C08G 18/7671* (2013.01); *C09D 175/04* (2013.01)

(58) Field of Classification Search
CPC ............ C08G 18/4812; C08G 18/4816; C08G 18/4837; C08G 18/7671; C09D 175/08; C09D 175/04
See application file for complete search history.

(56) References Cited

U.S. PATENT DOCUMENTS

| | | | |
|---|---|---|---|
| 2,720,401 A | 10/1955 | Fuehrer | |
| 4,555,536 A * | 11/1985 | Maki | C08G 18/5021 524/66 |
| 4,929,674 A * | 5/1990 | Nouvertne | C08L 69/00 525/127 |
| 4,945,149 A | 7/1990 | Matsumoto et al. | |
| 4,957,959 A | 9/1990 | Matsumoto et al. | |
| 5,352,508 A * | 10/1994 | Cheong | A61L 15/24 424/443 |
| 6,720,401 B2 | 4/2004 | Toyofuku et al. | |
| 2002/0013426 A1 | 1/2002 | Toyofuku et al. | |
| 2007/0287823 A1 | 12/2007 | Wada et al. | |
| 2012/0322936 A1 | 12/2012 | Li et al. | |
| 2016/0333193 A1 * | 11/2016 | Okumura | C09D 7/1241 |

FOREIGN PATENT DOCUMENTS

| | | |
|---|---|---|
| JP | 59-78227 | 5/1984 |
| JP | 62-057467 | 3/1987 |
| JP | 2-28210 | 1/1990 |
| JP | 8-311148 | 11/1996 |
| JP | 10-266077 | 10/1998 |
| JP | 2954631 | 7/1999 |
| JP | 2002-69370 | 3/2002 |
| JP | 2013-1905 | 1/2013 |
| WO | 2006/075710 | 7/2006 |

OTHER PUBLICATIONS

Author Unknown, The Dow Answer Center bulletin "Define Polyurethane Functionality, OH Number, and Equivalent Weight", Dec. 3, 2017, https://dowac.custhelp.com/app/answers/detail/a_id/13359/related/1.*
International Search Report dated Aug. 13, 2013 in PCT/JP2013/067132 filed Jun. 21, 2013.
The International Organization for Standardization, "ISO 14900:2001 (E), Plastics—Polyols for use in the production of polyurethane—Determination of hydroxyl number", First edition, Feb. 15, 2001.
Mihail Lonescu, "Chemistry and Technology of Polyols for Polyurethanes", Rapra Technology Limited, 2005.
Jacqueline I. Kroschwitz, "Encyclopedia of Chemical Technology", fourth edition, vol. 19, John Wiley and Sons, 1996.

* cited by examiner

*Primary Examiner* — Patrick D Niland
(74) *Attorney, Agent, or Firm* — Oblon, McClelland, Maier & Neustadt, L.L.P.

(57) ABSTRACT

To provide a coating agent capable of forming a coating layer or film excellent in moisture permeability, flexibility and tensile strength.
A coating agent comprising an isocyanate group-containing prepolymer obtainable by reacting a polyol mixture (A) and a polyisocyanate compound (B), wherein the polyol mixture (A) is a mixture of at least two polyoxyalkylene polyols which are different in the number of hydroxy groups or the hydroxy value, and said mixture has an average number of hydroxy groups being from 2.2 to 2.6, a molecular weight per hydroxy group being from 1,500 to 10,000 and an oxyethylene group content being at least 60 mass %.

14 Claims, No Drawings

COATING AGENT, AND COATING LAYER AND FILM USING SAME

TECHNICAL FIELD

The present invention relates to a coating agent suitable for forming a coating layer or film having moisture permeability, a coating layer obtainable by using the coating agent, and a film obtainable by using the coating agent.

BACKGROUND ART

It is known to form a layer of a hydrophilic polyurethane resin which is substantially non-porous, on a porous base material such as cloth, to produce a moisture permeable material suitable for application to e.g. a clothing material. The layer of this hydrophilic polyurethane resin absorbs moisture from a high humidity side and discharges moisture to a low humidity side thereby to provide a moisture permeability.

In order to form such a layer of a hydrophilic polyurethane resin, it is common to employ a method wherein a solution or dispersion of the hydrophilic polyurethane resin is applied on a porous base material to form a coating layer, a method wherein a coating agent selected from a mixture of raw materials for the hydrophilic polyurethane resin and a solution and dispersion thereof, is directly applied on a porous base material to form a coating layer, or a method wherein the coating agent is applied on a base material having a release property to form a non-cured coating layer which is not completely cured, and then such a non-cured coating layer is laminated on a porous base material, followed by curing.

As an intermediate of the hydrophilic polyurethane resin in the coating agent, it has been proposed to employ an isocyanate group-containing prepolymer obtainable by reacting a polyol mixture containing a polyoxyethylene polyol with a polyisocyanate compound (e.g. the following Patent Documents 1 and 2).

In Example of Patent Document 1, the polyol mixture used in preparation of an isocyanate group-containing prepolymer is a mixture having 80 parts of polyoxyalkylene triol with a hydroxy value of 47.0 and 700 parts of polyoxyalkylene diol with a hydroxy value of 56.1. In this polyol mixture, the average number of hydroxy groups is about 2.1, and the molecular weight per hydroxy group is about 1,000.

The method described in Patent Document 2 is characterized by using a polyoxyalkylene type polyol mixture which satisfies 2.7<n<3.6 where n is the average number of hydroxyl groups, and has an average oxyethylene group content of from 60 to 90 wt %, in the synthesis of the isocyanate group-containing prepolymer. The polyoxyalkylene type polyol mixture used in Example 4 (Comparative Example) in Patent Document 2, has an average number of hydroxy groups of 2.6, and a molecular weight per hydroxy group of about 1,093.

PRIOR ART DOCUMENTS

Patent Documents

Patent Document 1: Japanese Patent No. 2,954,631
Patent Document 2: JP-A-2002-69370

DISCLOSURE OF INVENTION

Technical Problem

Such a coating layer or film having a moisture permeability is desired to have more improved moisture permeability, flexibility and tensile strength, in accordance with diversification of its application.

However, it is not easy to improve these properties in good balance at the same time. For example, in order to improve the tensile strength, the average number of hydroxy groups of the polyol mixture may be increased, but in such a case, the flexibility tends to decrease.

Further, with respect to the coating agent disclosed in Patent Document 1 or 2, the storage stability of the isocyanate group-containing prepolymer used as an intermediate for a hydrophilic polyurethane resin is not necessarily be sufficient, and therefore improvement is desired.

The present invention has been made under these circumstances, and its object is to provide a coating agent capable of forming a coating layer or film excellent in moisture permeability, flexibility and tensile strength, a coating layer of a hydrophilic polyurethane resin as a cured product of the coating agent, and a film of a hydrophilic polyurethane resin as a cured product of the coating agent.

Preferably, another object is to provide a coating agent which is also excellent in storage stability of an isocyanate group-containing prepolymer used as the main component of the coating agent, a coating layer made of a cured product of the coating agent and a film made of a cured product of the coating agent.

Solution to Problems

In order to solve the above problems, the coating agent of the present invention comprises an isocyanate group-containing prepolymer obtainable by reacting a polyol mixture (A) and a polyisocyanate compound (B), wherein the polyol mixture (A) is a mixture of at least two polyoxyalkylene polyols which are different in either or both of the number of hydroxy groups and the hydroxy value, and said mixture has an average number of hydroxy groups being from 2.2 to 2.6, a molecular weight per hydroxy group being from 1,500 to 10,000 and an oxyethylene group content being at least 60 mass %.

It is preferred that the ratio of the number of moles of isocyanate groups in the polyisocyanate compound (B) to the number of moles of hydroxy groups in the polyol mixture (A), is from 3.0 to 4.5.

It is preferred that the polyol mixture (A) contains a polyoxyalkylene polyol (a) which has a number of hydroxy groups being at least 3, an oxyethylene group content being at least 60 mass % and a molecular weight per hydroxy group being from 1,500 to 10,000, and a polyoxyalkylene diol (b) which has a number of hydroxy groups being 2, an oxyethylene group content being at least 60 mass % and a molecular weight per hydroxy group being from 1,500 to 10,000.

The present invention provides a coating layer or film made of a cured product of the coating agent of the present invention.

Advantageous Effects of Invention

The coating layer or film of a hydrophilic polyurethane resin obtainable by curing the isocyanate group-containing prepolymer in the coating agent of the present invention is excellent in moisture permeability, flexibility and tensile strength. Further, the above isocyanate group-containing prepolymer is also excellent in storage stability.

According to the present invention, it is possible to obtain a coating layer or film excellent in flexibility and moisture permeability.

DESCRIPTION OF EMBODIMENTS

The coating agent of the present invention comprises an isocyanate group-containing prepolymer obtainable by reacting a polyol mixture (A) and a polyisocyanate compound (B).

Hereinafter, the isocyanate group-containing prepolymer obtainable by reacting the polyol mixture (A) and the polyisocyanate compound (B), is also referred to as "a prepolymer (X)". Further, a hydrophilic polyurethane resin as a cured product of the prepolymer (X), obtainable by curing the prepolymer (X) with a curing agent such as moisture or diamine, is also referred to as "a hydrophilic polyurethane resin (Y)".

The coating agent of the present invention is a coating agent containing only the prepolymer (X) as a reaction curable component or a coating agent containing the prepolymer (X) and a curing agent as reaction curable components.

In the case of the coating agent of the present invention containing only the prepolymer (X) as a reaction curable component, the prepolymer (X) in a coating layer formed by coating is cured by reacting it with moisture in air. In some cases, the prepolymer (X) in the coating layer may be cured by bringing it into contact with a gasified curing agent (for example, gasified diamine).

In the case of the coating agent of the present invention containing the prepolymer (X) and a curing agent as reaction curable components, it is preferred that coating is carried out immediately after the prepolymer (X) is mixed with the curing agent, since a usable time is usually short.

In the coating agent of the present invention, an additive such as a stabilizer, a urethane-forming catalyst or a reaction conditioning agent as mentioned below, other than the above reaction curable components, may be incorporated. Further, in a case where a low-viscosity coating agent is especially necessary for coating, a solvent may be incorporated therein. The solvent is removed from a coating layer by evaporation, after the coating layer is formed from the coating agent and before the prepolymer (X) is cured.

<Polyol Mixture (A)>

The polyol mixture (A) is a mixture of at least two polyoxyalkylene polyols which are different in either or both of the number of hydroxy groups and the hydroxy value, and said mixture has an average number of hydroxy groups being from 2.2 to 2.6 in the entire mixture, a molecular weight per hydroxy group being from 1,500 to 10,000 and an oxyethylene group content being at least 60 mass %.

When the average number of hydroxy groups of the polyol mixture (A) is at least 2.2, a coating layer or film of the hydrophilic polyurethane (Y) is excellent in tensile strength, and when it is at most 2.6, a coating layer or film of the hydrophilic polyurethane (Y) is excellent in flexibility and further the prepolymer (X) before curing is excellent in storage stability. The average number of hydroxy groups of the polyol mixture (A) is preferably from 2.2 to 2.6, more preferably from 2.3 to 2.6.

In order that the average number of hydroxy groups of the polyol mixture (A) would be within the above range, there is (1) a method of mixing at least two polyoxyalkylene polyols having different number of hydroxy groups or (2) a method of ring-opening addition polymerization of ethylene oxide or ethylene oxide and another monoepoxide with at least two mixing initiators having different number of active hydrogen atoms. Here, the number of active hydrogens of the initiators means the number of hydrogen atoms (that is, hydrogen atoms in reactive groups such as a hydroxy group and an amino group) which can be reacted with monoepoxide such as ethylene oxide by ring-opening addition.

When the molecular weight per hydroxy group of the polyol mixture (A) is at least 1,500, a coating layer or film of the hydrophilic polyurethane (Y) is excellent in flexibility and moisture permeability, and when it is at most 10,000, a coating layer or film of the hydrophilic polyurethane (Y) is excellent in tensile strength. The molecular weight per hydroxy group of the polyol mixture (A) is preferably from 1,500 to 10,000, more preferably from 1,500 to 8,000, particularly preferably from 1,500 to 5,000.

The polyol mixture (A) contains oxyethylene groups (—O—$C_2H_4$—). The oxyethylene group is a group to impart hydrophilicity to a urethane polymer, and when the oxyethylene content is at least 60 wt %, a favorable moisture permeability is likely to be obtained.

The oxyethylene group content of the polyol mixture (A) is preferably at least 60 mass %, more preferably at least 70 mass %. The upper limit of the oxyethylene group content is not particularly limited, but may be 100 mass %. It is preferably at most 95 mass %, more preferably at most 92 mass %, particularly preferably at most 90 mass % from the viewpoint of preventing crystallization of polyols at a low temperature.

The polyol mixture (A) preferably contains at least one type of the following polyoxyalkylene polyol (a) and at least one type of the following polyoxyalkylene diol (b).

That is, it is preferred to obtain the polyol mixture (A) having an average number of hydroxy groups being from 2.2 to 2.6 by mixing the polyoxyalkylene polyol (a) having a number of hydroxy groups being at least 3 and the polyoxyalkylene diol (b) having a number of hydroxy groups being 2.

<Polyoxyalkylene Polyol (a)>

The polyoxyalkylene polyol (a) is a polyoxyalkylene polyol which has a number of hydroxy groups being at least 3, an oxyethylene group content being at least 60 mass % and a molecular weight per hydroxy group being from 1,500 to 10,000.

The upper limit of the number of hydroxy groups of the polyoxyalkylene polyol (a) is not particularly limited, but it is preferably 4, more preferably 3 from the viewpoint of flexibility and storage stability of a coating layer or film of the hydrophilic polyurethane (Y).

The polyoxyalkylene polyol (a) is preferably one obtainable by ring-opening addition polymerization of ethylene oxide (hereinafter also referred to as EO) or ethylene oxide and a monoepoxide other than ethylene oxide, with a trivalent or higher valent initiator. The monoepoxide other than ethylene oxide will be hereinafter referred to as "another monoepoxide".

The trivalent or higher valent initiator is preferably a compound having a functional group which can be subjected to ring-opening addition with epoxide, for example an active hydrogen-containing group such as a hydroxy group, an amino group, an imino group or a carboxy group, and further having a number of active hydrogen atoms per molecule being at least 3. As an example, a compound such as a trivalent or higher valent polyhydric alcohol, or trivalent or higher valent polyhydric phenol, alkanoylamine or polyamine is used. Among them, a trivalent or tetravalent alcohol is more preferred.

The trivalent or higher valent initiator may, for example, be glycerol, trimethylolpropane, 1,2,6-hexanetriol, pentaerythritol, diglycerol, dextrose, sucrose, monoethanolamine, diethanolamine, triethanolamine, ethylenediamine, propylenediamine, diaminotoluene or diaminodiphenylmethane. Glycerol, pentaerythritol or trimethylolpropane is particularly preferred. The initiator may be used alone or in combination as a mixture of two or more of them.

In a case where EO and another monoepoxide are used as monoepoxides to be subjected to ring-opening addition polymerization with an initiator, such another monoepoxide preferably contains at least one $C_{3-4}$ alkyl oxide such as propylene oxide (hereinafter also referred to as PO), 1,2-butylene oxide or 2,3-butylene oxide. Further, an alkylene oxide other than the $C_{3-4}$ alkylene oxide may also be contained. For example, styrene oxide, epichlorohydrin or glycidylalkyl (or aryl) ether may be used in combination.

The order of addition of ethylene oxide and such another monoepoxide to the initiator is not particularly limited, and they may be subjected to block or random ring-opening addition polymerization.

The polyoxyalkylene polyol (a) may contain as a component other than oxyethylene groups a residue of the initiator and a residue derived from such another monoepoxide.

The content of the residue of such another monoepoxide is preferably at least 5 mass %, more preferably at least 8 mass %, based on the total amount of the polyoxyalkylene polyol (a). When the content of the residue of such another monoepoxide is at least 5 mass %, the polyoxyalkylene polyol (a) is hardly solidified, whereby the handling efficiency is easily improved. Further, solidification or viscosity increase of the prepolymer (X) obtainable by using the polyoxyalkylene polyol (a) is easily suppressed.

As the residue of such another monoepoxide, a residue of propylene oxide (that is, an oxypropylene group) is preferably contained. The component other than the residue of the initiator, of the polyoxyalkylene polyol (a), particularly preferably comprises an oxyethylene group and an oxypropylene group.

When the polyoxyalkylene polyol (a) has oxypropylene groups, the polyoxyalkylene polyol (a) is easily be liquefied at normal temperature and thereby is easily handled. Further, the prepolymer (X) obtainable by using the polyoxyalkylene polyol (a) is likely to have a low viscosity.

The oxyethylene group content in the polyoxyalkylene polyol (a) is at least 60 mass %, preferably at least 70 mass %, more preferably at least 80 mass %. When it is at least 60 mass %, the coating layer or film of the hydrophilic polyurethane (Y) is excellent in moisture permeability.

The upper limit of the oxyethylene group content in the polyoxyalkylene polyol (a) is not particularly limited, but as mentioned above, the residue of such another monoepoxide is preferably contained in an amount of at least 5 mass %.

The molecular weight per hydroxy group of the polyoxyalkylene polyol (a) is from 1,500 to 10,000, preferably from 1,500 to 8,000, more preferably from 1,500 to 5,000.

When the molecular weight per hydroxy group of the polyoxyalkylene polyol (a) is at least the lower limit of the above range, the coating layer or film of the hydrophilic polyurethane (Y) is excellent in flexibility and moisture permeability, and when it is at most the upper limit, the coating layer or film of the hydrophilic polyurethane (Y) is excellent in tensile strength.

<Polyoxyalkylene Diol (b)>

The polyoxyalkylene polyol (b) is a polyoxyalkylene diol having a number of hydroxy groups being 2, an oxyethylene group content being at least 60 mass % and a molecular weight per hydroxy group being from 1,500 to 10,000.

It is preferred that the polyoxyalkylene diol (a) is one obtainable by ring-opening addition polymerization of ethylene oxide or ethylene oxide and another monoepoxide with a bivalent initiator.

The bivalent initiator is preferably a compound having a functional group which can be subjected to ring-opening addition with epoxide, for example an active hydrogen-containing group such as a hydroxy group, an amino group, an imino group or a carboxy group, and further having at least 2 active hydrogen atoms per molecule. As an example, a compound such as a bivalent alcohol, phenol, alkanoylamine, monoamine or polyamine is used.

Among them, a bivalent alcohol is more preferred. Specifically, propylene glycol, ethylene glycol, 1,4-butanediol, diethylene glycol, dipropylene glycol, triethylene glycol or tripropylene glycol may, for example, be mentioned. Among them, propylene glycol, ethylene glycol, diethylene glycol or dipropylene glycol is particularly preferred. These initiators may be used alone or two or more of them may be used in combination.

Another monoepoxide to be subjected to ring-opening addition polymerization with an initiator is the same as in the above polyoxyalkylene polyol (a) including a preferred embodiment.

The order of addition of ethylene oxide and such another monoepoxide to the initiator is not particularly limited, and they may be subjected to block or random ring-opening addition polymerization.

The polyoxyalkylene diol (b) may contain as a component other than the oxyethylene groups a residue of the initiator and a residue derived from another monoepoxide.

The content of the residue of another monoepoxide is preferably at least 5 mass %, more preferably at least 8 mass % based on the total amount of the polyoxyalkylene diol (b). When the content of the residue of another monoepoxide is at least 5 mass %, the polyoxyalkylene diol (b) is hardly solidified, whereby the handling efficiency is easily improved. Further, solidification or viscosity increase of the prepolymer (X) obtainable by using the polyoxyalkylene diol (b) is easily suppressed.

As the residue of another epoxide, a residue of propylene oxide (that is, an oxypropylene group) is preferably contained. The component other than the residue of the initiator, of the polyoxyalkylene diol (b), particularly preferably comprises an oxyethylene group and an oxypropylene group.

When the polyoxyalkylene diol (b) has oxypropylene groups, the polyoxyalkylene diol (b) is easily liquefied at normal temperature, and thereby is easily handled. Further, the prepolymer (X) obtainable by using the polyoxyalkylene diol (b) is likely to have a low viscosity.

The oxyethylene group content in the polyoxyalkylene diol (b) is at least 60 mass %, preferably at least 70 mass %, more preferably at least 80 mass %. When it is at least 60 mass %, the coating layer or film of the hydrophilic polyurethane (Y) is excellent in moisture permeability.

The upper limit of the oxyethylene group content in the polyoxyalkylene diol (b) is not particularly limited, but as mentioned above, the residue of another monoepoxide is preferably contained in an amount of at least 5 mass %.

The molecular weight per hydroxy group of the polyoxyalkylene diol (b) is from 1,500 to 10,000, preferably from 1,500 to 8,000, more preferably from 1,500 to 5,000.

When the molecular weight per hydroxy group of the polyoxyalkylene diol (b) is at least the lower limit of the above range, the coating layer or film of the hydrophilic polyurethane (Y) is excellent in flexibility and moisture permeability, and when it is at most the upper limit, the coating layer or film of the hydrophilic polyurethane (Y) is excellent in tensile strength.

The polyol mixture (A) may contain another polyoxyalkylene polyol (c) which is included in neither the polyoxyalkylene polyol (a) nor polyoxyalkylene diol (b), within a range not to impair the effect of the present invention, and further within a range where the polyol mixture (A) has an average number of hydroxy groups being from 2.2 to 2.6, a molecular weight per hydroxy group being from 1,500 to 10,000 and an oxyethylene group content being at least 60 mass %.

The proportion of the total amount of the polyoxyalkylene polyol (a) and the polyoxyalkylene diol (b) to the entire polyol mixture (A) is preferably at least 50 mass %, more preferably at least 70 mass %, particularly preferably 100%. That is, the polyol mixture (A) is particularly preferably a mixture of the polyoxyalkylene polyol (a) and the polyoxyalkylene diol (b).

It is possible to adjust the average number of hydroxy groups of the polyol mixture (A) by the content ratio (a)/(b) of the polyoxyalkylene polyol (a) to the polyoxyalkylene diol (b) in the polyol mixture (A). It is preferred that the content ratio (a)/(b) is set depending upon the value of the average number of hydroxy groups of the polyol mixture (A) to be obtained.

<Polyisocyanate Compound (B)>

The polyisocyanate compound (B) to be used in the present invention is not particularly limited, but may, for example, be an aromatic polyisocyanate compound such as 4,4'-diphenylmethane diisocyanate (MDI), 2,4'-diphenylmethane diisocyanate (2,4'-MDI), naphthalene-1,5-diisocyanate, polyphenylenepolymethylene polyisocyanate (also referred to as polymeric MDI or crude MDI), 2,4-tolylene diisocyanate or 2,6-tolylene diisocyanate; an aralkyl polyisocyanate compound such as tetramethylxylylene diisocyanate or xylylene diisocyanate; an aliphatic polyisocyanate compound such as hexamethylene diisocyanate; an alicyclic polyisocyanate compound such as isophorone diisocyanate or 4,4'-methylenebis(cyclohexyl isocyanate); or a urethane-, biuret-, allophanate-, carbodiimide- or isocyanurate-modified product obtainable from the above polyisocyanate compound.

As the polyisocyanate compound (B), an aromatic diisocyanate is preferred, and among them, 4,4'-diphenylmethane diisocyanate is preferred, since the reactivity with the polyol mixture (A) is excellent and the viscosity of the prepolymer (X) obtainable is usually low.

Further, in an application where yellowing with time is unfavorable, the aliphatic polyisocyanate compound or the alicyclic polyisocyanate compound is preferred, and hexamethylene diisocyanate or isophorone diisocyanate is particularly preferred.

The polyisocyanate compound (B) may be used alone or two or more of them may be used in combination.

The prepolymer (X) in the present invention is obtainable by reacting the polyol mixture (A) with the polyisocyanate compound (B) under conditions where the amount of isocyanate groups is stoichiometrically in excess.

Specifically, the ratio (hereinafter also referred to as NCO/OH) of the number of moles of isocyanate groups in the polyisocyanate compound (B) to be reacted with the polyol mixture (A), to the number of moles of hydroxy groups in the polyol mixture (A), is preferably from 3.0 to 4.5, more preferably from 3.0 to 4.0. When the NCO/OH is at least 3.0, an isocyanate group-containing prepolymer is excellent in storage stability and a coating layer or film of the hydrophilic polyurethane (Y) is excellent in tensile strength, and when it is at most 4.5, a coating layer or film of the hydrophilic polyurethane (Y) is excellent in flexibility and moisture permeability.

Further, when the NCO/OH is at least 3.0, a relatively large amount of unreacted polyisocyanate compound (B) is present in the prepolymer (X). The prepolymer (X) in the present invention also means a prepolymer containing such an unreacted polyisocyanate compound (B).

The viscosity (25° C.) of the prepolymer (X) is not particularly limited, but is preferably at most 40,000 mPa·s (20,000 cP), more preferably at most 30,000 mPa·s, from the viewpoint of obtaining a coating agent having good handling efficiency even without using a solvent.

Here, the value of the viscosity of the isocyanate group-containing prepolymer in this specification is a value at 10 minutes after initiation of measurement at a temperature of 25° C. by mounting a rotor (No. 4 (3°×R14)) on an RE85U type viscometer, manufactured by Toki Sangyo Co., Ltd.

<Curing Agent>

In the present invention, a curing agent is used for curing the prepolymer (X). The curing agent may be moisture in an atmosphere for curing or a gaseous compound, or a compound to be used as mixed with the prepolymer (X). That is, the coating agent of the present invention may be a coating agent containing only the prepolymer (X) as a reaction curing component (in such a case, it is cured by moisture in air or a gaseous curing agent), or a coating agent comprising at least two components of the prepolymer (X) and a curing agent for curing the prepolymer (X) as reaction curing components.

As the curing agent, a compound having at least two functional groups which are reactive with isocyanate groups, is used, and a relatively low molecular weight polyol, alkanolamine or polyamine is applied. Further, water also functions as a bifunctional curing agent, but in the present invention, a curing agent means one other than water.

A particularly preferred curing agent is a diol or a diamine having a molecular weight of at most 400, preferably at most 300, particularly preferably at most 200. For example, ethylene glycol, 1,4-butanediol, neopentyl glycol, 1,6-hexanediol, 1,5-pentanediol, ethylenediamine, tetramethylenediamine, hexamethylenediamine, dichlorobenzidine or isophoronediamine may, preferably, be mentioned.

In a case where the above curing agent is used, the amount to be used is preferably such that the functional groups in the curing agent are from 0.3 to 1.3 mol, particularly preferably from 0.4 to 1.0 mol, per 1 mol of all isocyanate groups in the prepolymer (X). In a case where the amount of the curing agent to be used is less than 1 mol, residual isocyanate groups are reacted with e.g. moisture in air, whereby the prepolymer (X) is cured.

Further, it is also possible to cure the prepolymer (X) by moisture in air or a polyamine vapor without using the above curing agent. Especially, it is preferred that a coating layer made of the prepolymer (X) is cured by moisture in air or a gasified diamine to form a coating layer or film of the hydrophilic polyurethane (Y).

In the coating agent of the present invention, various components other than main raw material comprising the prepolymer (X) or a combination of the prepolymer (X) with its curing agent, may properly be incorporated.

As such other components, various stabilizers called an ultraviolet absorber, a photostabilizer and an antioxidant may, for example, be blended.

The above ultraviolet absorber is one used for preventing light deterioration of the coating agent composition thereby improving the weather resistance, and a benzotriazole type, triazine type, benzophenone type or benzoate type ultraviolet absorber may, for example, be mentioned.

The benzotriazole type ultraviolet absorber may, for example, be 2-(2-hydroxy-5-methylphenyl)benzotriazole, 2,4-bis(1-methyl-1-phenylethyl)-6-(2H-benzotriazol-2-yl) phenol, 2-(5-chloro-2-benzotriazolyl)-6-tert-butyl-p-cresol, 2-(2-hydroxy-5-tert-octylphenyl)benzotriazole, (2,2-methylenebis[6-(2H-benzotriazol-2-yl)-4-(1,1,3,3-tetramethylbutyl)phenol] or 2-(2H-benzotriazol-2-yl)-4,6-bis(1,1-dimethyl-propyl)-phenol.

The triazine type ultraviolet absorber may, for example, be 2-[4,6-diphenyl-1,3,5-triazin-2-yl]-5-(hexyloxy)phenol or 2-[4,6-bis(2,4-dimethylphenyl)-1,3,5-triazin-2-yl]-5-(isooctyloxy)-phenol.

The benzophenone type ultraviolet absorber may, for example, be 2-hydroxy-4-n-octyloxybenzophenone or (2,4-dihydroxyphenyl)phenyl-methanone.

The benzoate type ultraviolet absorber may, for example, be 2-[4,6-diphenyl-1,3,5-triazin-2-yl]-5-(hexyloxy)phenol.

The above photostabilizer is one used for preventing light deterioration of the coating agent composition thereby improving weather resistance, and a hindered amine type photostabilizer may, for example, be mentioned.

The hindered amine type photostabilizer may, for example, be the following compound.

N,N'-bis(2,2,6,6-tetramethyl-4-piperidinyl)-N'-[4-[butyl (2,2,6,6-tetramethyl-4-piperidinyl)amino]-1,3,5-triazin-2-yl]-1,6-hexanediamine, 1-[2-(4-hydroxy-2,2,6,6-tetramethylpiperidino)ethyl]butanedioate, bis(1,2,2,6,6-pentamethylpiperidin-4-yl) 2-butyl-2-(4-hydroxy-3,5-di-tert-butylbenzyl) malonate, bis(1,2,2,6,6-pentamethylpiperidin-4-yl) decanedioate, bis(2,2,6,6-tetramethyl-4-piperidinyl) decanedioate, tetrakis(1,2,2,6,6-pentamethyl-4-piperidinyl) butane-1,2,3,4-tetracarboxylate, tetrakis(2,2,6,6-tetramethylpiperidin-4-yl) 1,2,3,4-butanetetracarboxylate, 1,2,2,6,6-pentamethyl-4-piperidyl methacrylate, (1,2,2,6,6-pentamethylpiperidin-4-yl) methacrylate, 2,2,6,6-tetramethyl-4-piperidyl methacrylate, 7-oxa-3,20-diazadispiro[5.1.11.2]heneicosane-20-propanoic acid 2,2,4,4-tetramethyl-21-oxo-dodecyl/tetradecyl ester, 2,2,4,4-tetramethyl-7-oxa-3,20 diazadispiro[5.1.11.2]heneicosan-21-one, β-alanine N-(2,2,4,4-tetramethyl-4-piperidinyl)-dodecyVtetradecyl ester, 3-dodecyl-1-(2,2,6,6-tetramethyl-4-piperidinyl) 2,5-pyrrolidinedione or N-acetyl-3-dodecyl-1-(2,2,6,6-tetra-methyl-4-piperidinyl) 2,5-pyrrolidinedione.

The above antioxidant is one used for preventing oxidation of the coating agent composition thereby improving the weather resistance or the heat resistance, and a phenol type or phosphorus type antioxidant may, for example, be mentioned.

The phenol type antioxidant may, for example, be the following compound.

Pentaerythritol tetrakis[3-(3,5-di-tert-butyl-4-hydroxyphenyl)propionate], 2,2'-thiodiethylbis[3-(3,5-di-tert-butyl-4-hydroxyphenyl)propionate], stearyl 3-(3,5-di-tert-butyl-4-hydroxyphenyl) propionate, N,N'-(1,6-hexanediyl)bis[3,5-bis(1,1-dimethylethyl)-4-hydroxybenzenepropanamide], octyl-3,5-di-tert-butyl-4-hydroxy-hydrocinnamate, 2,4,6-tris(3',5'-di-tert-butyl-4'-hydroxybenzyl)mesitylene, calcium bis[3,5-di(tert-butyl)-4-hydroxybenzyl(ethoxy)phosphinate], 2,4-bis(octylthiomethyl)-6-methylphenol, 2,4-bis [(octylthio)methyl]-6-methylphenol, ethylenebis(oxy-2,1-ethanediyl)bis[3-(1,1-dimethylethyl)-4-hydroxy-5-methylbenzenepropionate], 1,6-hexandiol-bis[3(3,5-di-t-butyl-4-hydroxyphenyl)propionate], 1,3,5-tris[[3,5-bis(1,1-dimethylethyl)-4-hydroxyphenyl]methyl]-1,3,5-triazine-2,4,6(1H,3H,5H)-trione, 1,1'-iminobis[4-(1,1,3,3-tetramethyl-butyl)benzene], 4-[[4,6-bis(octylthio)-1,3,5-triazin-2-yl] amino]-2,6-di-tert-butylphenol or diethyl{[3,5-bis(1,1-dimethylethyl)-4-hydroxyphenyl]methyl}phosphonate.

The phosphorus type antioxidant may, for example, be the following compound.

Triphenyiphosphite, diphenylisodecylphosphite, phenyldiisodecylphosphite, 4,4'-butylidene-bis(3-methyl-6-t-butylphenylditridecyl)phosphite, cyclic neopentanetetraylbis (nonylphenyl)phosphite, cyclic neopentanetetraylbis (dinonylphenyl)phosphite, cyclic neopentanetetrayltris (nonylphenyl)phosphite, cyclic neopentanetetrayltris (dinonylphenyl)phosphite, 10-(2,5-dihydroxyphenyl)-10H-9-oxa-10-phosphaphenanthrene-10-oxide, diisodecyl pentaerythritol diphosphite, tris(2,4-di-t-butylphenyl)phosphite, bis(2,4-di-tert-butyl-6-methylphenyl) =ethyl=phosphite or butylidenebis[(2-tert-butyl-5-methyl-4,1-phenylene)oxy]bis(phosphonous acid ditridecylester).

In the coating agent of the present invention, a urethane-forming catalyst such as a tertiary amine or an organic tin compound for accelerating a curing reaction may also be incorporated. In addition, a flame retardant, a filler, a colorant, a plasticizer, a reaction conditioning agent or other components may optionally be incorporated.

The reaction conditioning agent may be phosphoric acid or a phosphoric acid ester. The phosphoric acid ester may, for example, be ethyl phosphate, butyl phosphate, 2-ethylhexyl phosphate or bis(2-ethylhexyl)phosphate.

Further, as mentioned above, in a case where the viscosity of the prepolymer (X) is high, a solvent may suitably be used. In a case where the coating agent of the present invention contains a solvent, the solvent is removed by evaporation from a coating layer containing the prepolymer (X) and the solvent, and then the prepolymer (X) is cured.

The hydrophilic polyurethane (Y) obtainable from the coating agent of the present invention has moisture permeability, and is suitably used for application to form a coating layer or film which is substantially nonporous. Specifically, the coating agent is applied on a porous base material (such as a cloth) or a releasable base material (such as a sheet having a releasability or a release paper), and the prepolymer (X) is cured to form a coating layer or film made of the hydrophilic polyurethane (Y). In the present invention, one being laminated on a base material is called a coating layer, and a coating layer being released from the base material is called a film.

The coating layer or film of the hydrophilic polyurethane (Y) obtainable from the coating agent of the present invention has moisture permeability while it is substantially nonporous. Here, the expression "substantially nonporous" means that it is not formed by a method for forming a porous film, such as wet solidification method.

Further, the coating layer or film of the hydrophilic polyurethane (Y) obtainable from the coating agent of the present invention may be in the form of a foam having bubbles, but is preferably substantially in the form of non-foam, that is, substantially in the form of a solid coating layer or film, from the viewpoint of obtaining good air permeability.

In this specification, the expression "has moisture permeability" means that the value of the moisture permeability is at least 10,000 g/m$^2$·24 h, when the coating agent is formed into a film having a thickness of 0.05 mm to measure the moisture permeability (unit: g/m$^2$·24 h) in accordance with JIS Z-0208. According to the coating agent of the present invention, it is possible to obtain a coating layer or film of the hydrophilic polyurethane (Y) having a moisture permeability of at least 35,000 g/m²·24 h, preferably at least 45,000 g/m²·24 h. When the moisture permeability is 35,000 g/m²·24 h, in e.g. a case where the coating agent is used for a cloth, the cloth having a layer of the hydrophilic polyurethane (Y) obtainable can quickly eliminate dampness due to sweating or the like, whereby comfortability improves.

According to the coating agent of the present invention, it is possible to form a coating layer or film of the hydrophilic polyurethane resin excellent in moisture permeability, flexibility and tensile strength. Further, the isocyanate group-containing prepolymer used as the main component of the coating agent of the present invention is excellent in storage stability.

It is considered that such effects can be obtained for the following reasons. That is, it is considered that by increasing the molecular weight per hydroxy group to be at least 1,500 and adjusting the average number of hydroxy groups to be within a range of from 2.2 to 2.6 in the polyol mixture (A) having an oxyethylene group content being at least 60 mass %, the molecular weight between cross-linkages is appropriately increased thereby to improve the moisture permeability, and at the same time, it is possible to obtain good flexibility and tensile strength by the balance between the degree of crosslinking and the molecular weight between cross-linkages.

Further, it is considered that by increasing the molecular weight per hydroxy group to be at least 1,500, the flexibility and the moisture permeability are less likely to be deteriorated even when the ratio of NCO/OH in an isocyanate group-containing prepolymer is increased (that is, the isocyanate group content is increased in the case of using a polyol having the same hydroxy value), and at the same time, by the increase of the NCO/OH, the storage stability of the isocyanate group-containing prepolymer is improved.

EXAMPLES

Now, the present invention will be described in further detail with reference to Examples, but it should be understood that the present invention is by no means restricted by such specific Examples. In these Examples, "parts" means "parts by mass".

Raw materials used in each Example are as follows.
<Polyoxyalkylene Polyol>
 Polyols (a-1) and (c-1): A polyoxyalkylene triol obtained by ring-opening addition polymerization of a mixture (a mass ratio of EO:PO is 80:20) of ethylene oxide (EO) and propylene oxide (PO) with glycerol as an initiator, by using a potassium hydroxide catalyst. (a-1) and (c-1) are different in molecular weight. The number of hydroxy groups, the oxyethylene group content (EO content), the hydroxy value, the molecular weight as calculated by a hydroxy value and the molecular weight per hydroxy group of each polyol, are shown in Table 1 (hereinafter, the same applies).
 Polyols (b-1) and (c-2): A polyoxyalkylene diol obtained by ring-opening addition polymerization of a mixture (a mass ratio of EO:PO is 80:20) of ethylene oxide (EO) and propylene oxide (PO) with propylene glycol as an initiator, by using a potassium hydroxide catalyst. (b-1) and (c-2) are different in molecular weight.
<Polyisocyanate Compound>
 As the polyisocyanate compound (B), 4,4'-diphenylmethane diisocyanate (abbreviated as MDI) was used.

TABLE 1

| | Number of hydroxy groups | EO Content [mass %] | Hydroxy value [mgKOH/g] | Molecular weight as calculated by hydroxy value | Molecular weight per hydroxy group |
|---|---|---|---|---|---|
| Polyol (a-1) | 3 | 80 | 28.1 | 5989 | 1996 |
| Polyol (b-1) | 2 | 80 | 28.1 | 3993 | 1996 |
| Polyol (c-1) | 3 | 80 | 47.0 | 3581 | 1194 |
| Polyol (c-2) | 2 | 80 | 56.3 | 1993 | 996 |

Examples 1 to 7

Examples 1 to 2 are Examples of the present invention, and Examples 3 to 7 are Comparative Examples.

Polyols are mixed in a blend ratio as shown in Table 2 to prepare the polyol mixture (A). The average number of hydroxy groups, the molecular weight per hydroxy group and the oxyethylene group content (described as "EO content" in Table) of the polyol mixture (A) are shown in Table 2.

Then, various additives were mixed in a blend ratio as shown in Table 2, to 100 parts of the polyol mixture (A) obtained. Here, the structure and the manufacturer of each additive in Table are as follows.

Further, MDI as the polyisocyanate compound (B) was added thereto so that NCO/OH (molar ratio) would be a value shown in Table 2, followed by reacting at 70° C. for 5 hours to obtain an isocyanate group-containing prepolymer.

The storage stability of the isocyanate group-containing prepolymer obtained was evaluated by the after-mentioned method.

IRGANOX-245 (tradename, manufactured by BASF): bis[3-(3-tert-butyl-4-hydroxy-5-methylphenyl)propionic acid][ethylenebis(oxyethylene)], TINUVIN-234 (tradename, manufactured by BASF): 2-[2-hydroxy-3,5-bis(α,α-dimethylbenzyl)phenyl]-2H-benzotriazole, TINUVIN-765 (tradename, manufactured by BASF): bis(1,2,2,6,6-pentamethyl-4-piperidyl)sebacate, HOSTAVIN 3050 (tradename, manufactured by Clariant K.K.): 7-oxa-3,20-diazadispiro[5.1.11.2]heneicosane-20-propanoic acid 2,2,4,4-tetramethyl-21-oxo-dodecyl/tetradecyl ester, IRGASTAB PUR68 (tradename, manufactured by BASF): (structure not disclosed), AP-8 (tradename, manufactured by Daihachi Chemical Industry Co., Ltd.): 2-ethylhexyl phosphate, Phosphoric acid: Phosphoric acid 85 wt % aqueous solution (manufactured by Junsei Chemical Co., Ltd.)

<Method for Preparing Film for Evaluating Moisture Permeability>

An isocyanate group-containing prepolymer obtained was used to prepare a film for evaluating moisture permeability. That is, the isocyanate group-containing prepolymer was applied on a 300 μm-thick porous PTFE film in a predetermined thickness, and left at rest for 4 days in an atmosphere at 23° C. in 60% R.H., followed by moisture curing to prepare a film for evaluating moisture permeability.

<Method for Preparing Film for Evaluating Mechanical Properties>

An isocyanate group-containing prepolymer obtained was used to prepare a film for evaluating mechanical properties. That is, the isocyanate group-containing prepolymer was applied on a 75 μm-thick OPP film in a predetermined thickness, and left at rest for 4 days in an atmosphere at 23° C. in 60% R.H., followed by moisture curing. Then, the moisture cured film of the isocyanate group-containing prepolymer was peeled from the OPP film to prepare a film for evaluating mechanical properties.

With respect to the film obtained, the moisture permeability and mechanical properties were evaluated in accordance with the after-mentioned methods. The coating thickness of the film for evaluating the moisture permeability was adjusted to have a thickness after curing being 0.05 mm, and the coating thickness of the film for evaluating the mechanical properties was adjusted to have a thickness after curing being 0.15 mm.

<Evaluation of Moisture Permeability>

The above 0.05 mm-thick film obtained, was used to measure the moisture permeability (unit: g/m²·24 h) in accordance with JIS Z-0208. The results are shown in Table 2. The larger the value of the moisture permeability is, the better the moisture permeability becomes.

<Evaluation of Mechanical Properties>

The above 0.15 mm-thick film obtained, was used to measure elongation (unit: %), tensile strength (Ts, unit: MPa) and 100% modulus ($M_{100}$, unit: MPa) in accordance with JISK-6301. The results are shown in Table 2.

The 100% modulus ($M_{100}$) is a value as an index for flexibility, and the smaller the value is, the better the flexibility is.

<Evaluation of Storage Stability>

The viscosity of the isocyanate group-containing prepolymer immediately after preparation was measured and taken as the initial density. The isocyanate group-containing prepolymer was stored for 3 days in an atmosphere at 80° C., and then the viscosity was measured and taken as the viscosity after 3 days. The viscosity increase rate (unit: %) was calculated by the following formula (1). The smaller the viscosity increase rate is, the better the storage stability is. The results are shown in

TABLE 2

Viscosity increase rate (%) = (viscosity after 3 days − initial viscosity)/initial viscosity × 100 . . . (1)

| | | | Ex. 1 | Ex. 2 | Ex. 3 | Ex. 4 |
|---|---|---|---|---|---|---|
| Blend | Polyol mixture (A) | Polyol a-1 [part] | 23 | 60 | 90 | 10 |
| | | Polyol b-1 [part] | 77 | 40 | 10 | 90 |
| | | Polyol c-1 [part] | — | — | — | — |
| | | Polyol c-2 [part] | — | — | — | — |
| | | Average number of hydroxy groups | 2.2 | 2.6 | 2.9 | 2.1 |
| | | Molecular weight per hydroxy group | 1996 | 1996 | 1996 | 1996 |
| | | EO content [mass %] | 80 | 80 | 80 | 80 |
| | Additive | IRGANOX-245 [part] | 0.62 | | 0.62 | 0.62 |
| | | Tinuvin-234 [part] | 0.86 | | 0.86 | 0.86 |
| | | HOSTAVIN 3050 [part] | 0.99 | | 0.99 | 0.99 |
| | | Tinuvin-765 [part] | | 1.18 | | |
| | | IRGASTAB PUR68 [part] | | 0.99 | | |
| | | AP-8 [part] | | 0.01 | | |
| | | Phosphoric acid [part] | 0.0025 | 0.0025 | 0.0025 | 0.0025 |
| | Polyisocyanate compound (B) | NCO/OH | 4.5 | 3.0 | 2.5 | 5.0 |
| Evaluation | Moisture permeability of film | Moisture permeability [g/m²·24 h] | 36000 | 47000 | 22000 | 20000 |
| | Mechanical properties of film | $M_{100}$ [MPa] | 1.1 | 1.3 | 1.8 | 0.7 |
| | | Ts [MPa] | 9.6 | 9.7 | 13.4 | 2.2 |
| | | Elongation [%] | 1070 | 790 | 540 | 1320 |
| | Storage stability of isocyanate group-containing prepolymer (storing at 80° C.) | Initial viscosity [mPa·s] | 6,500 | 14,600 | 68,600 | 5,820 |
| | | Viscosity after 3 days [mPa·s] | 10,100 | 19,700 | 261,000 | 8,000 |
| | | Viscosity increase rate [%] | 48 | 35 | 280 | 37 |

| | | | Ex. 5 | Ex. 6 | Ex. 7 |
|---|---|---|---|---|---|
| Blend | Polyol mixture (A) | Polyol a-1 [part] | — | — | 78 |
| | | Polyol b-1 [part] | — | — | 22 |
| | | Polyol c-1 [part] | 100 | 60 | — |
| | | Polyol c-2 [part] | — | 40 | — |
| | | Average number of hydroxy groups | 3 | 2.7 | 2.7 |
| | | Molecular weight per hydroxy group | 1194 | 1115 | 1996 |

TABLE 2-continued

Viscosity increase rate (%) = (viscosity after 3 days − initial viscosity)/
initial viscosity × 100 ... (1)

|  |  |  |  |  |  |
|---|---|---|---|---|---|
|  |  | EO content [mass %] | 80 | 80 | 80 |
|  | Additive | IRGANOX-245 [part] | 0.62 | 0.62 |  |
|  |  | Tinuvin-234 [part] | 0.86 | 0.86 |  |
|  |  | HOSTAVIN 3050 [part] | 0.99 | 0.99 |  |
|  |  | Tinuvin-765 [part] |  |  | 1.18 |
|  |  | IRGASTAB PUR68 [part] |  |  | 0.99 |
|  |  | AP-8 [part] |  |  | 0.01 |
|  |  | Phosphoric acid [part] | 0.0025 | 0.0025 | 0.0025 |
|  | Polyisocyanate compound (B) | NCO/OH | 4.0 | 2.5 | 3.0 |
| Evaluation | Moisture permeability of film | Moisture permeability [g/m²·24 h] | 19000 | 29000 | 66000 |
|  | Mechanical properties of film | M₁₀₀ [MPa] | 3.9 | 2.1 | 1.4 |
|  |  | Ts [MPa] | 8.5 | 4.4 | 10.4 |
|  |  | Elongation [%] | 1260 | 220 | 580 |
|  | Storage stability of isocyanate group-containing prepolymer (storing at 80° C.) | Initial viscosity [mPa·s] | 7,600 | 18,300 | 24,500 |
|  |  | Viscosity after 3 days [mPa·s] | 15,400 | 35,600 | 54,700 |
|  |  | Viscosity increase rate [%] | 103 | 94 | 123 |

As is seen from results of Tables 1 and 2, the resulting film has excellent moisture permeability, flexibility and tensile strength, and the isocyanate group-containing prepolymer also has good storage stability, in Examples 1 and 2 where the average number of hydroxy groups is from 2.2 to 2.6, the molecular weight per hydroxy group is from 1,500 to 10,000 and the oxyethylene group content is at least 60 mass % in the polyol mixture (A), and NCO/OH is from 3.0 to 4.5.

On the other hand, in Example 5, the average number of hydroxy groups is as large as 3.0 and the molecular weight per hydroxy group is as small as 1194 in the polyol mixture (A), and therefore the moisture permeability, the flexibility and the storage stability of the isocyanate group-containing prepolymer are poor.

In Example 3, the average number of hydroxy groups in the polyol mixture (A) is as large as 2.9, and NCO/OH is as small as 2.5. In this Example, the storage stability of the isocyanate group-containing prepolymer is poor.

In Example 4, the average number of hydroxy groups of the polyol mixture (A) is as small as 2.1, and NCO/OH is as large as 5.0. In this Example, the tensile strength and the moisture permeability of the film are poor.

In Example 6, the molecular weight per hydroxy group is as small as 1,115, and NCO/OH is as small as 2.5. In this Example, the moisture permeability, the flexibility, the tensile strength and the storage stability of the isocyanate group-containing prepolymer are poor.

In Example 7, the average number of hydroxy groups of the polyol mixture (A) is as large as 2.7. In this Example, the storage stability of the isocyanate group-containing prepolymer is poor.

Especially when Example 2 and Example 6 are compared, it is found that the moisture permeability is remarkably improved when the molecular weight per hydroxy group is at least 1,500.

INDUSTRIAL APPLICABILITY

The coating agent of the present invention is used for forming a coating layer or film of a hydrophilic polyurethane resin which has moisture permeability and is substantially nonporous. The coating layer or film of a hydrophilic polyurethane resin obtainable can be used for application such as a material for clothing having moisture permeability.

This application is a continuation of PCT Application No. PCT/JP2013/067132 filed on Jun. 21, 2013, which is based upon and claims the benefit of priority from Japanese Patent Application No. 2012-143222 filed on Jun. 26, 2012. The contents of those applications are incorporated herein by reference in their entireties.

What is claimed is:

1. A coating agent comprising an isocyanate group-containing prepolymer obtained by reacting a polyol mixture (A) and a polyisocyanate compound (B),
wherein
the polyisocyanate compound (B) is an aromatic diisocyanate, and
the polyol mixture (A) comprises:
  a polyoxyalkylene polyol (a) which has a number of hydroxy groups being at least 3, and an oxyethylene group content being at least 60 mass %; and
  a polyoxyalkylene diol (b) which has a number of hydroxy groups being 2, and an oxyethylene group content being at least 60 mass %,
wherein the polyol mixture (A) has an average number of hydroxy groups being from 2.2 to 2.6, and an oxyethylene group content being at least 60 mass %,
wherein a value obtained by dividing a molecular weight of the polyoxyalkylene polyol (a) calculated from a hydroxyl value (mgKOH/g) of the polyoxyalkylene polyol (a) by the number of hydroxyl groups in the polyoxyalkylene polyol (a) is from 1,500 to 10,000, wherein a value obtained by dividing a molecular weight of the polyoxyalkylene diol (b) calculated from a hydroxyl value (mgKOH/g) of the polyoxyalkylene diol (b) by the number of hydroxyl groups in the polyoxyalkylene diol (b) is from 1,500 to 10,000, and wherein a value obtained by dividing a molecular weight of the polyol mixture (A) calculated from a hydroxyl value (mgKOH/g) of the polyol mixture (A) by the average number of hydroxyl groups in the polyol mixture (A) is from 1,500 to 10,000.

2. The coating agent according to claim 1, wherein the polyol mixture (A) has an oxyethylene group content being from 70 to 95 mass %, and the value obtained by dividing the molecular weight of the polyol mixture (A) calculated from the hydroxyl value (mgKOH/g) of the polyol mixture (A) by the average number of the hydroxyl groups in the polyol mixture (A) is from 1,500 to 5,000.

3. The coating agent according to claim 1, wherein the ratio of the number of moles of isocyanate groups in the polyisocyanate compound (B) to the number of moles of hydroxy groups in the polyol mixture (A), is from 3.0 to 4.5.

4. The coating agent according to claim 1, wherein the polyoxyalkylene polyol (a) is a polyoxyalkylene polyol having a number of hydroxy groups being 3 or 4, an oxyethylene group content being at least 70 mass % and the value obtained by dividing the molecular weight of the polyoxyalkylene polyol (a) calculated from the hydroxyl value (mgKOH/g) of the polyoxyalkylene polyol (a) by the number of hydroxyl groups in the polyoxyalkylene polyol (a) is from 1,500 to 5,000.

5. The coating agent according to claim 1, wherein the polyoxyalkylene polyol (a) is a polyoxyalkylene polyol having an oxypropylene group content being at least 5 mass %, which is obtained by ring-opening addition polymerization of ethylene oxide and propylene oxide to an initiator.

6. The coating agent according to claim 1, wherein the polyoxyalkylene diol (b) has an oxyethylene group content being at least 70 mass % the value obtained by dividing the molecular weight of the polyoxyalkylene diol (b) calculated from the hydroxyl value (mgKOH/g) of the polyoxyalkylene diol (b) by the number of hydroxyl groups in the polyoxyalkylene diol (b) is from 1,500 to 5,000.

7. The coating agent according to claim 6, wherein the polyoxyalkylene diol (b) is a polyoxyalkylene diol having an oxypropylene group content being at least 5 mass %, which is obtained by ring-opening addition polymerization of ethylene oxide and propylene oxide to an initiator.

8. The coating agent according to claim 1, further comprising a curing agent.

9. The coating agent according to claim 8, wherein the curing agent is a diol or a diamine.

10. A coating layer or film made of a cured product of the isocyanate group-containing prepolymer in a coating layer obtained by applying the coating agent as defined in claim 1.

11. The coating layer or film according to claim 10, wherein the isocyanate group-containing prepolymer is cured by moisture in air or a gasified curing agent.

12. The coating agent according to claim 1, wherein the value obtained by dividing the molecular weight of the polyol mixture (A) calculated from the hydroxyl value (mgKOH/g) of the polyol mixture (A) by the average number of hydroxyl groups in the polyol mixture (A) is from 1,996 to 10,000.

13. The coating agent according to claim 1, wherein when a cured film of the coating agent having a thickness of 0.05 mm is made, a moisture permeability of the coating film is 35,000 g/m$^2$·24 h or more when measured in accordance with JIS Z-0208.

14. The coating agent according to claim 1, wherein when a cured film of the coating agent having a thickness of 0.05 mm is made, a moisture permeability of the coating film is 45,000 g/m$^2$·24 h or more when measured in accordance with JIS Z-0208.

* * * * *